(12) United States Patent
Bansal et al.

(10) Patent No.: US 8,613,038 B2
(45) Date of Patent: Dec. 17, 2013

(54) METHODS AND APPARATUS FOR DECODING MULTIPLE INDEPENDENT AUDIO STREAMS USING A SINGLE AUDIO DECODER

(75) Inventors: Rahul Bansal, Delhi (IN); Philippe Monnier, Villare Bonnot (FR); Shiv Kumar Singh, New Delhi (IN); Kausik Maiti, Ghaziabad (IN); Nitin Jain, Meerut (IN)

(73) Assignees: STMicroelectronics International N.V., Amsterdam (NL); STMicroelectronics (Grenoble) SAS, Grenoble (FR)

( * ) Notice: Subject to any disclaimer, the term of this patent is extended or adjusted under 35 U.S.C. 154(b) by 341 days.

(21) Appl. No.: 12/910,432

(22) Filed: Oct. 22, 2010

(65) Prior Publication Data

US 2012/0102538 A1    Apr. 26, 2012

(51) Int. Cl.
*H04N 7/16*    (2011.01)
(52) U.S. Cl.
USPC .................. 725/151; 725/143; 704/E19.001; 704/E19.005

(58) Field of Classification Search
USPC ........................................................... 725/90
See application file for complete search history.

(56) References Cited

U.S. PATENT DOCUMENTS

| | | | |
|---|---|---|---|
| 6,081,783 A | 6/2000 | Divine et al. | |
| 6,233,562 B1 | 5/2001 | Sueyoshi et al. | |
| 6,583,821 B1* | 6/2003 | Durand | 348/515 |
| 2003/0018796 A1* | 1/2003 | Chou et al. | 709/231 |
| 2006/0023706 A1* | 2/2006 | Varma et al. | 370/389 |
| 2006/0167682 A1* | 7/2006 | Lecomte et al. | 704/223 |

* cited by examiner

*Primary Examiner* — Justin Shepard
(74) *Attorney, Agent, or Firm* — Graybeal Jackson LLP

(57) ABSTRACT

An embodiment of the present invention discloses a system and method for decoding multiple independent encoded audio streams using a single decoder. The system includes one or more parsers, a preprocessor, an audio decoder, and a renderer. The parser extracts individual audio frames from each input audio stream. The preprocessor combines the outputs of all parsers into a single audio frame stream and enables sharing of the audio decoder among multiple independent encoded audio streams. The audio decoder decodes the single audio frame stream and provides a single decoded audio stream. And the renderer renders the individual reconstructed audio streams from the single decoded audio stream.

46 Claims, 8 Drawing Sheets

METHODS AND APPARATUS FOR DECODING MULTIPLE INDEPENDENT AUDIO STREAMS USING A SINGLE AUDIO DECODER

TECHNICAL FIELD

An embodiment of the present invention relates to an audio signal processing system, and more specifically to a decoder for decoding multiple independent audio streams.

SUMMARY

Audio signal processing has become increasingly important in today's multimedia environment. Audio data processing is an important requirement for many multimedia applications, such as gaming and in telecommunications. One of the key elements in many digital audio information processing systems is the audio decoder. Generally, the audio decoder receives data in a compressed form and converts that data into a decompressed digital form.

FIG. 1 illustrates an approach for decoding audio signals in an audio-video playback system. In an audio-video playback system, multiplexed audio-video streams are fed into the system for processing. The multiplexed streams are de-multiplexed and then fed into the audio and video subsystems. The multiplexed streams are of various formats such as MPEG2, PES, Windows Media files, AVI etc. Examples of audio-video playback system are Set Top Box, DVD player etc.

In an audio subsystem, the audio playback includes three stages: audio parsing, audio decoding, and audio rendering. In the audio parsing stage, the encoded data is extracted from its container (PES, File containers etc.) and constructed into a stream of audio frames. Each of these frames is an independent decodable unit. In addition to the compressed data, some metadata like PTS, etc is attached to these frames. In the audio decoding stage, audio frames are fed into a hardware/software decoder. This decoder decodes the compressed data and outputs PCM samples. Metadata could be used by the decoding stage or forwarded to the next stage. In addition to the original metadata some additional parameters such as sampling frequency, number of channels and bits per sample are attached to the decoded data by the decoding stage. In the audio rendering phase, PCM data is formatted (according to the requirements of the system's output interfaces) and output to the external interfaces exposed by the system.

U.S. Pat. No. 6,081,783, which is incorporated herein by reference, discloses an audio decoder operating on a received compressed audio data stream. The audio data stream has been compressed using an algorithm utilizing transform encoding and a bit allocation routine. The audio decoder includes a first digital signal processor and a second digital signal processor. The first digital signal processor executes a first set of operations on the received compressed audio data stream including parsing the compressed audio data stream, recovering data fields within the compressed audio data stream, calculating bit allocation, and passing frequency domain coefficients to shared memory. The second digital signal processor executes a second set of operations on the data provided by the first digital signal processor including performing inverse transform operations on the data passed from the first digital signal processor.

U.S. Pat. No. 6,233,562, which is incorporated herein by reference, discloses an audio decoding device, which decodes coded audio information with multiple channels. The audio decoding device includes a coded information memory section, an information transmission section, and an audio decoding section. The coded information memory section stores the coded audio information. The information transmission section reads the coded audio information stored at an arbitrary position in the coded information memory section. The audio decoding section decodes the coded audio information read by the information transmission section and outputs the resultant audio information in accordance with a time parameter.

The above-mentioned patents are known for decoding two independent audio streams. The limitation with said patents is that they need two independent audio decoders for decoding two independent audio streams simultaneously and this result in significant overhead and resource requirements.

Therefore, there is a need of a system for decoding multiple independent audio streams using a single decoder.

One embodiment of the present disclosure describes a system for decoding multiple independent encoded audio streams comprising a parser coupled to each input encoded audio stream for extracting individual audio frames, a preprocessor coupled to the outputs of all parsers for combining the outputs of said parsers into a single audio frame stream, an audio decoder coupled to the output of said preprocessor for decoding the single audio frame stream, and a renderer coupled to the output of said audio decoder for generating the individual output decoded audio streams from the single decoded stream.

This disclosure also describes an embodiment of a set-top-box comprising audio and video subsystems, said audio subsystem comprising a parser coupled to each input encoded audio stream for extracting individual audio frames, a preprocessor coupled to the outputs of all parsers for combining the outputs of said parsers into a single audio frame stream, an audio decoder coupled to the output of said preprocessor for decoding the single audio frame stream, and a renderer coupled to the output of said audio decoder for generating the individual output decoded audio streams from the single decoded stream.

This disclosure further describes an embodiment of a DVD player comprising audio and video subsystems, said audio subsystem comprising a parser coupled to each input encoded audio stream for extracting individual audio frames, a preprocessor coupled to the outputs of all parsers for combining the outputs of said parsers into a single audio frame stream, an audio decoder coupled to the output of said preprocessor for decoding the single audio frame stream, and a renderer coupled to the output of said audio decoder for generating the individual output decoded audio streams from the single decoded stream.

This disclosure also describes an embodiment of an audio processor capable of decoding multiple independent audio streams, said audio processor comprising a parser coupled to each input encoded audio stream for extracting individual audio frames, a preprocessor coupled to the outputs of all parsers for combining the outputs of said parsers into a single audio frame stream, an audio decoder coupled to the output of said preprocessor for decoding the single audio frame stream, and a renderer coupled to the output of said audio decoder for generating the individual output decoded audio streams from the single decoded stream.

This disclosure further describes an embodiment of a method for decoding multiple independent encoded audio streams comprising parsing each independent encoded audio stream for extracting individual audio frames, preprocessing the extracted individual audio frames for combining into a single encoded audio frame stream, allocating a shared audio decoder resource to decode said encoded audio frame stream when said decoder resource is available, producing a single decoded audio stream, and rendering the individual output decoded audio streams from said decoded audio stream.

BRIEF DESCRIPTION OF THE DRAWINGS

One or more embodiments of the present invention will be explained in the following description, taken in conjunction with the accompanying drawings, wherein.

DETAILED DESCRIPTION

Figure 1:
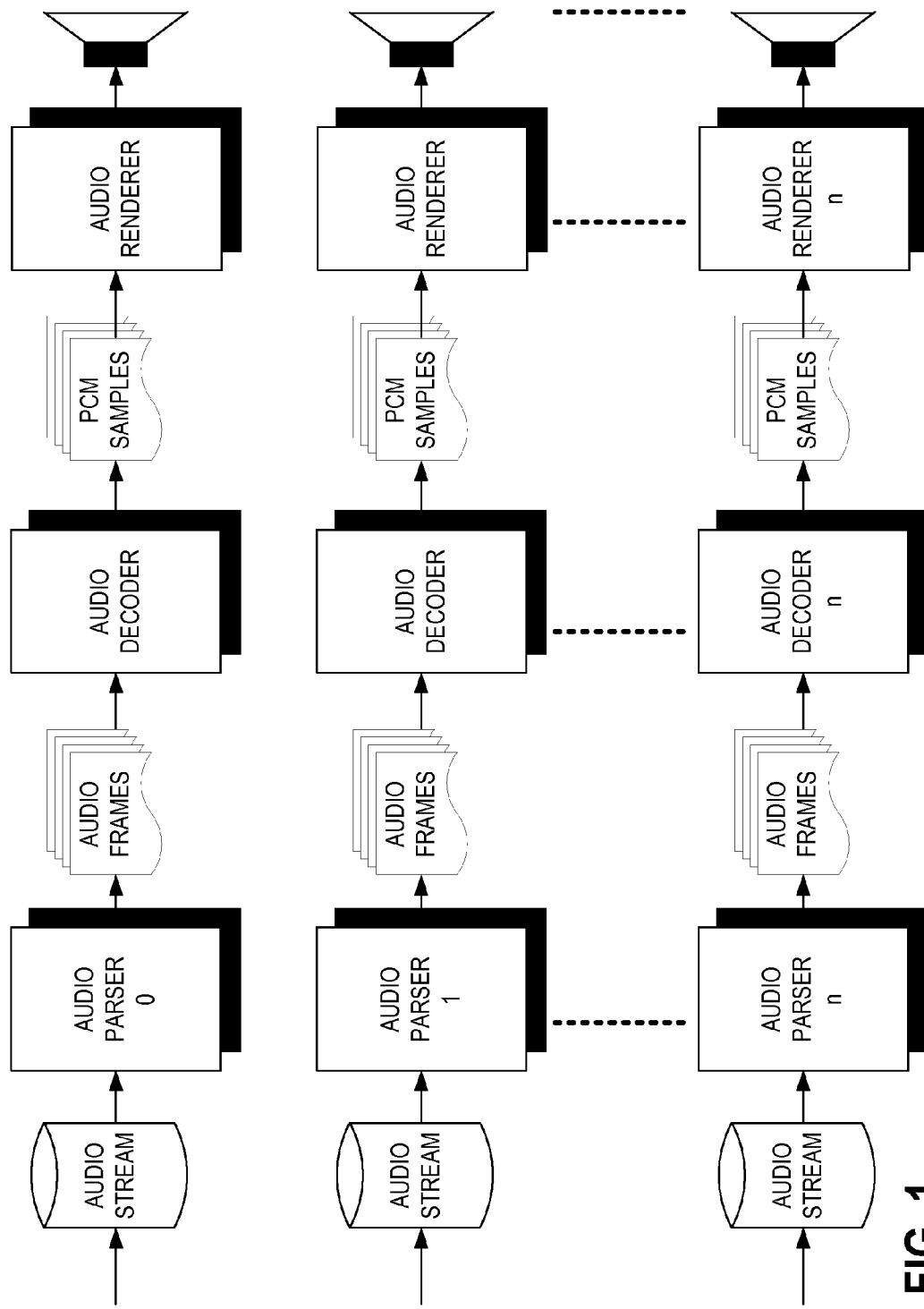
FIG. 1 illustrates a conventional approach for decoding audio signals in an audio-video playback system.

One or more embodiments of the present invention will be described in detail with reference to the accompanying drawings. However, the present invention is not limited to these embodiments. The present invention can be modified in various forms. In the accompanying drawings, like reference numerals are used to indicate like components.

Figure 2:
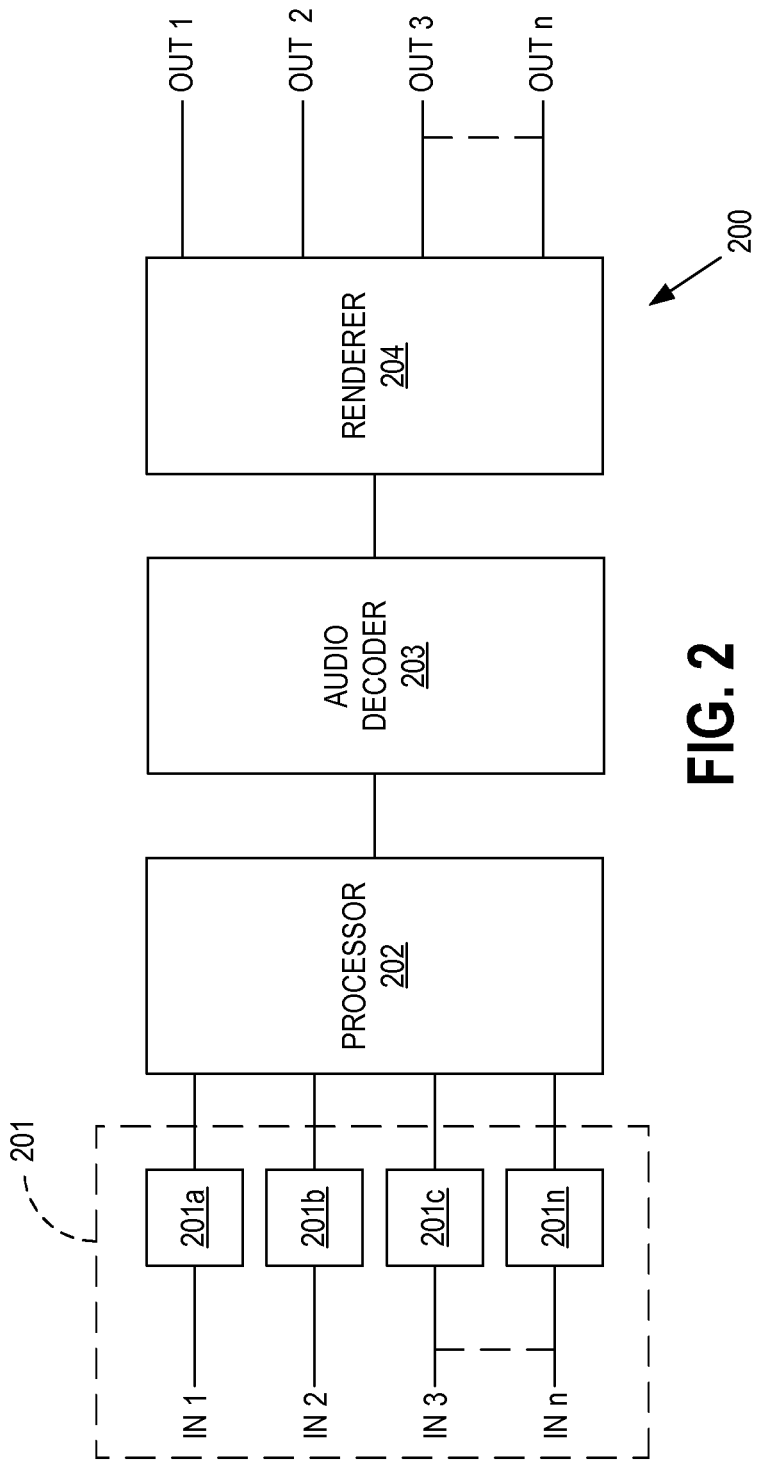
FIG. 2 illustrates a block diagram of a system for decoding multiple independent encoded audio streams according to an embodiment of the present invention.

FIG. 2 illustrates the block diagram of a system 200 for decoding multiple independent encoded audio streams according to an embodiment of the present invention. The system 200 includes one or more parsers 201, a preprocessor 202, an audio decoder 203, and a renderer 204. Each parser 201 extracts individual encoded audio frames from the audio stream. Preprocessor 202, which is coupled to the outputs of all the parsers receives the extracted audio frames and combines them into a single pseudo interleaved audio frame stream. Audio decoder 203 decodes the received interleaved audio frame stream and provides a single pseudo-interleaved decoded audio stream. Renderer 204 receives the single pseudo-interleaved decoded audio stream, discards redundant decoded frames and segregates the remaining decoded audio frames into multiple decoded audio frame streams. In one embodiment of the present invention, the preprocessor 202 is software. The terms "preprocessor" and "audio driver" are used interchangeably in the description below.

Figure 3:
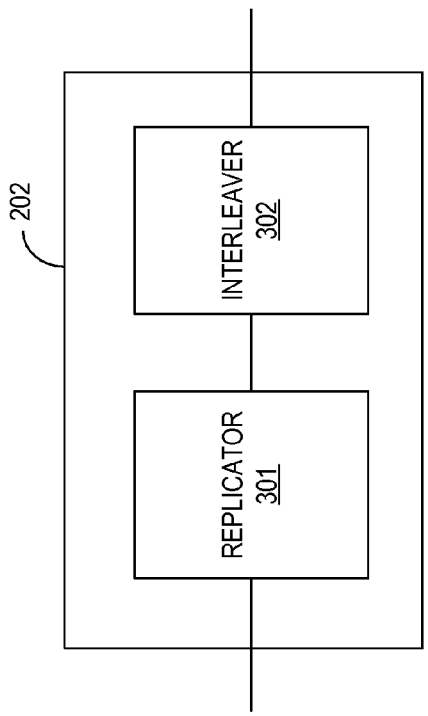
FIG. 3 illustrates the block diagram of the preprocessor of FIG. 2 according to an embodiment of the present invention.

FIG. 3 illustrates the block diagram of the preprocessor 202 according to an embodiment of the present invention. Preprocessor 202 includes a replicator 301 and an interleaver 302. Replicator 301 receives extracted individual audio frames from the output of the parser and repeats selected audio frames depending on a windowing filter. Replicator 301 may repeat all frames except the first and the last frame of the input audio stream. The number of replicas is determined by the number of samples required for the window filter to converge to the point where proper filtered samples are available. Interleaver 302 receives the repeated audio frames and combines them into a single pseudo-interleaved audio frame stream. After decoding, the pseudo-interleaved audio frame stream is applied to the window filter (which is an intrinsic part of the decoder 203) for providing filtered audio frames.

Preprocessing Process

Decoding of a stream by the audio decoder 203 through the audio driver is initiated when two conditions are met: firstly, the audio driver has collected number of frames for decoding and secondly, the audio decoder is available for decoding.

The value of "K" is determined by the number of samples taken by a particular audio type for its windowing filter to converge to the value from where it starts giving proper output and number of PCM samples generated per frame.

So if,

"K"=Number of continuous compressed frames to be collected

"S"=Number of Samples per frame

"N"=Number of Samples taken by windowing filter to converge

Then K will be given by the equation $$K = [N/S] + n \qquad \text{Eq. 1}$$

n>0 (where n is an integer)

Until both of the above conditions are met (in the same order), the audio driver waits. As the above said conditions are met, the following steps are taken to decode until the $I^{th}$ frame where I is last of the collected "K" frames 1. All the collected frames i.e. (I−K+1), (I−K+2), . . . , I are fed to the audio decoder in the same order as they were received.
2. After the decoding process is completed, the audio decoder is released so that it can be used by the other instance of audio driver running in the system.
3. The selected frames are I, I-1, . . . I-n+1
4. All the metadata received with the selected frames are attached to the current output buffers.
5. Output buffers along with their associated metadata can be delivered to the next stage for further processing or playback.

Figure 4:
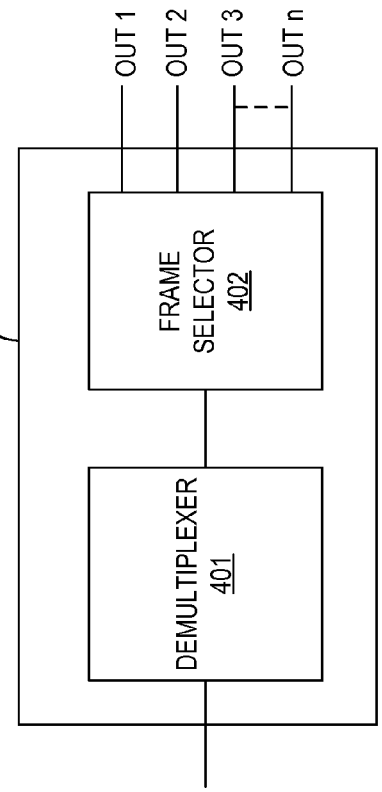
FIG. 4 illustrates the block diagram of the renderer of FIG. 2 according to an embodiment of the present invention.

FIG. 4 illustrates a block diagram of the renderer 204 according to an embodiment of the present invention. Renderer 204 includes a demultiplexer 401 and a frame selector 402. Demultiplexer 401 segregates the decoded audio frames into multiple decoded audio frame streams depending on the input. Frame selector 402 discards redundant decoded frames from the decoded audio frame stream.

Rendering Process

The audio driver has already collected K number of frames on any stream, out of which only X number of frames are useful. Hence, in the delivery process, Y numbers of frames are dropped to get the right frames.

"K"=Number of Frames collected at an input to the decoder.

"Y"=Number of Frames to be dropped at an output of the decoder.

"S"=Number of Samples per frame

"N"=Number of Samples taken by windowing filter to converge

"X"=Number of frames to be delivered at the rendering stage.

$$Y = [N/S] \qquad \text{Eq. 2}$$

Now the Number of frames sent for post-rendering processing will be given by $$X = K - Y \qquad \text{Eq. 3}$$

The audio decoder produces all the decoded frames, i.e. 1, 2 . . . K. Out of these the first Y frames are dropped and X frames are sent for further processing.

Figure 5:
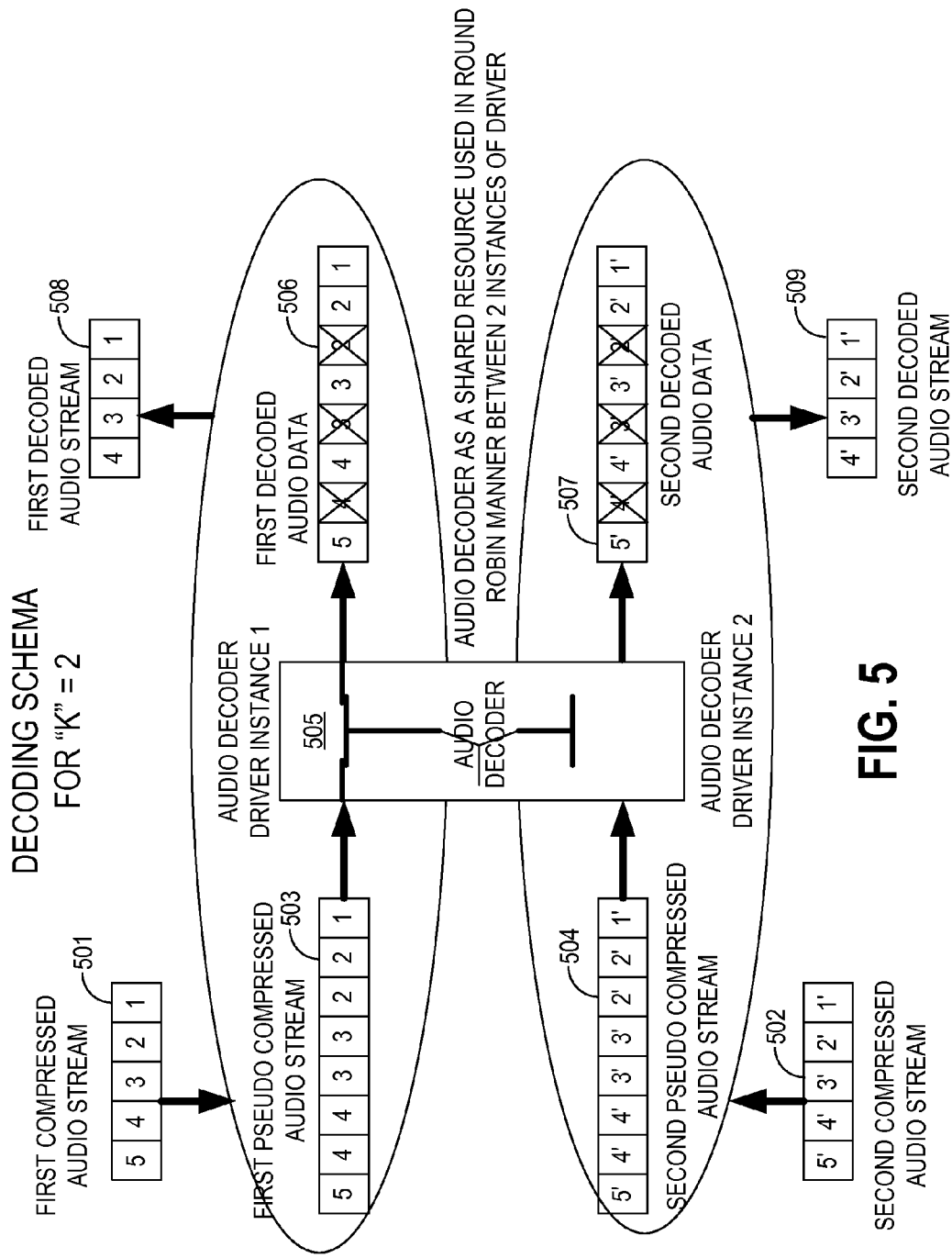
FIG. 5 illustrates a mechanism for decoding multiple independent encoded audio streams according to an embodiment of the present invention.

FIG. 5 illustrates a mechanism for decoding multiple independent encoded audio streams according to an embodiment of the present invention. Consider two independent compressed encoded audio streams 501, 502. Each independent encoded audio stream is parsed for extracting individual audio frames from their containers (PES, File containers etc). Then the metadata (PTS, etc.) is extracted from the streams. Selected extracted audio frames are replicated to form audio streams 503 and 504. Audio decoder 505 is time multiplexed between audio stream 503 and audio stream 504 (which thereby function as a single pseudo-interleaved audio stream fed to the audio decoder). Two decoded audio streams 508, 509 are generated from the demultiplexed decoded audio streams 506 and 507 respectively by dropping a selected number of frames at the output of audio decoder 505.

Figure 6:
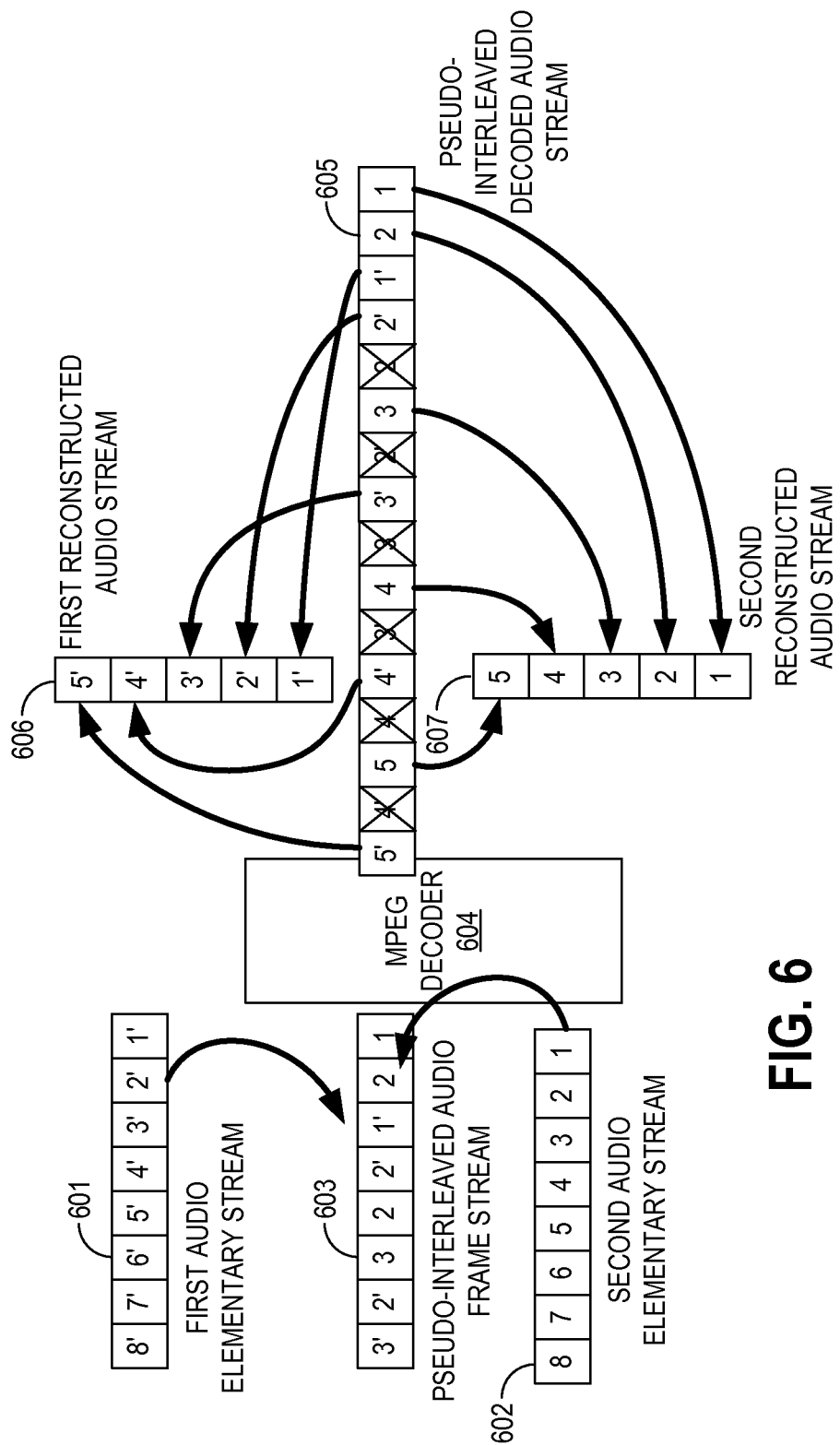
FIG. 6 illustrates a mechanism for decoding multiple independent encoded audio streams according to another embodiment of the present invention.

FIG. 6 illustrates a method for decoding multiple independent encoded audio streams according to another embodiment of the present invention. The embodiment is related to decoding MPEG audio signals such as MPEG1 layer 2/3 or MPEG2. Consider a first parsed audio elementary stream 601 and a second parsed audio elementary stream 602. The two streams are interleaved for creating a pseudo-interleaved stream 603 by replicating selected audio frames. Two consecutive frames of each independent stream 601, 602 are copied alternatively to create the pseudo-interleaved stream 603. Pseudo-interleaved stream 603 is provided to an MPEG decoder 604. MPEG decoder 604 decodes the pseudo-interleaved stream 603 and producing a pseudo-interleaved decoded audio stream 605. Then selected numbers of frames are dropped from the pseudo-interleaved decoded audio stream 605 for forming a first reconstructed audio stream 606 and a second reconstructed audio stream 607. The selected numbers of frames refer to redundant frames, which are to be dropped. The MPEG1 Layer 2 frame size is 1152 samples. The audio decoder 604 needs 480 samples of previous frames to produce the output without any distortion.

S=Number of Samples per frame=1152
N=Number of Samples taken by windowing filter to converge=480
n=1
Therefore as per equation 1 value of K (number of frames) will be $$K = \lceil 480/1152 \rceil + 1 = 2$$

Number of frames to be dropped: $Y = \lceil 480/1152 \rceil = 1$
Number of frames to be sent for post-rendering processing:

$$X = K - Y$$
$$= 2 - 1 = 1$$

Processing Requirements (MIPS/MHz)

Processing requirements for any audio type which may be decoded with the method described above may be calculated as follows:
If,
P=MIPS required to decode a single stream of a particular audio type K=Number of continuous compressed frames to be collected as derived from equation 1
P'=Total Processing requirement (MIPS)
Then, $$P' = P*K \qquad \text{Eq. 4}$$

If the processing requirement to decode a single MPEG 1 layer 2/3 or MPEG2 stream is P MIPS, then as per the equation 4 stream, the worst case processing requirement P' will become $$P' = 2*P \text{ MIPS}$$

Figure 7:
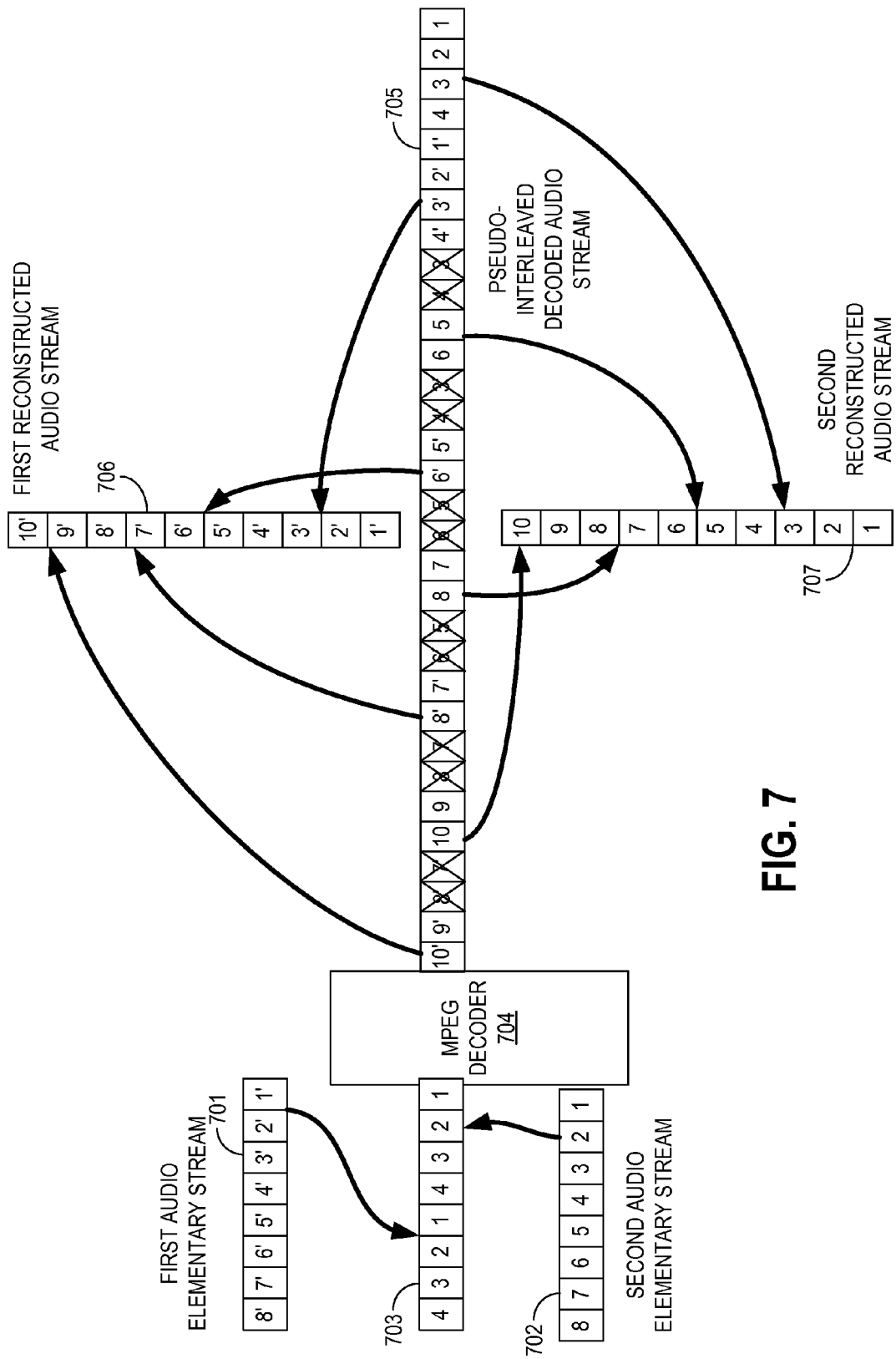
FIG. 7 illustrates a mechanism for decoding multiple independent encoded audio streams according to yet another embodiment of the present invention.

FIG. 7 illustrates a method for decoding multiple independent encoded audio streams according to yet another embodiment of the present invention. The embodiment demonstrates the applicability of decoding process for MPEG1 Layer 1. The process of decoding is almost similar to the process explained in FIG. 6 but in this embodiment, four consecutive frames of each independent stream 701, 702 are copied alternatively to create the pseudo interleaved stream 703 instead of two consecutive frames in the previous embodiment (FIG. 6).

The MPEG1 Layer1 frame size is 384 samples. The audio decoder needs 480 samples of previous frames to produce the output without any distortion.

S=Number of Samples per frame=384
N=Number of Samples taken by windowing filter to converge=480
n=1
Therefore as per equation 1 value of K will be $$K = \lceil 480/384 \rceil + 1 = 3$$
$$\text{Number of frames to be dropped} = Y = \lceil 480/384 \rceil = 2$$
$$\text{Number of frames to be sent for processing} = X = K - Y$$
$$= 3 - 2$$
$$= 1$$

If processing requirement to decode a single MPEG1 layer 1 stream is P MIPS then as per equation 2 stream worst case processing requirement P' will become $$P' = 3*P \text{ MIPS}$$

Optimizing Processing Requirements (MIPS/MHz)

As calculated in equation 2, processing power required for decoding a single stream using this algorithm will depend on the number of frames generated from a decoding sequence. Therefore if we increase the number of frames generated per decoding sequence then processing power requirement will come down. Therefore $$P'_{opt} = (P*(K+M))/(M+1) \qquad \text{Eq. 5}$$

where
P=MIPS required to decode a single stream of a particular audio type
K=Minimum number of continuous compressed frames to be collected
M=Number of valid additional decoded frames generated per decoding sequence Processing requirements for a stream may be reduced at the cost of memory (buffering) and system delay, in delivering decoded audio data.

Therefore as per equation 3, if we consider M=1 and K=3, $$P'_{opt} = (P^*(K+M))/(M+1)$$
$$P'_{opt} = (P^*(3+1))/(1+1)$$
$$= 2^* PMIPS$$

Thus, FIG. 7 describes the method of reducing the processing requirement for MPEG 1 Layer 1 from 3*P to 2*P, by using M=1 and decoding 4 frames at a time instead of minimum 3 frames and getting 2 valid decoded frames.

Figure 8:
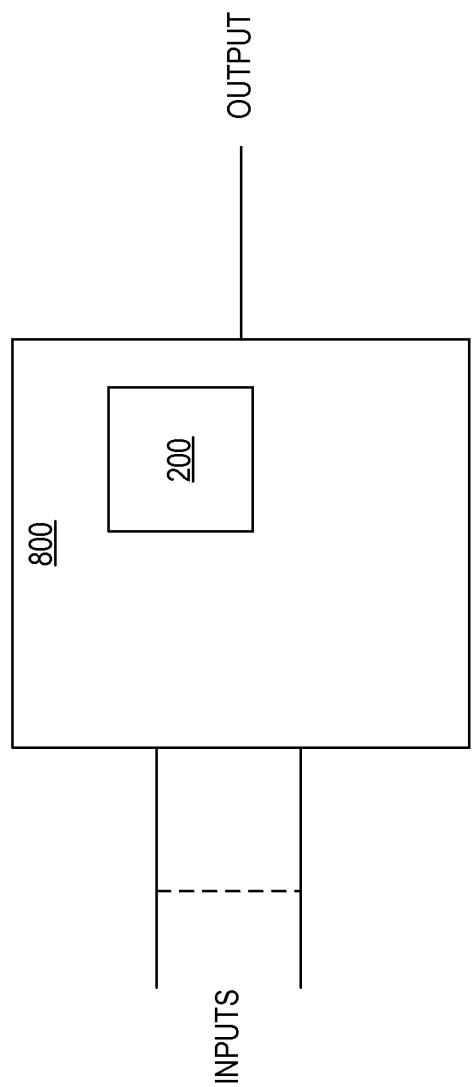
FIG. 8 illustrates a block diagram that discloses an application for a system, which decodes multiple independent encoded audio streams according to an embodiment of the present invention.

FIG. 8 illustrates a block diagram that discloses an application for a system 200, decoding multiple independent encoded audio streams, according to an embodiment of the present invention used in a set-top-box 800. The set-top-box 800 includes audio and video subsystems. The audio subsystem 200 includes a parser, a preprocessor, an audio decoder, and a renderer. According to another embodiment of the present invention, the system 200 is used in a DVD player.

Figure 9:
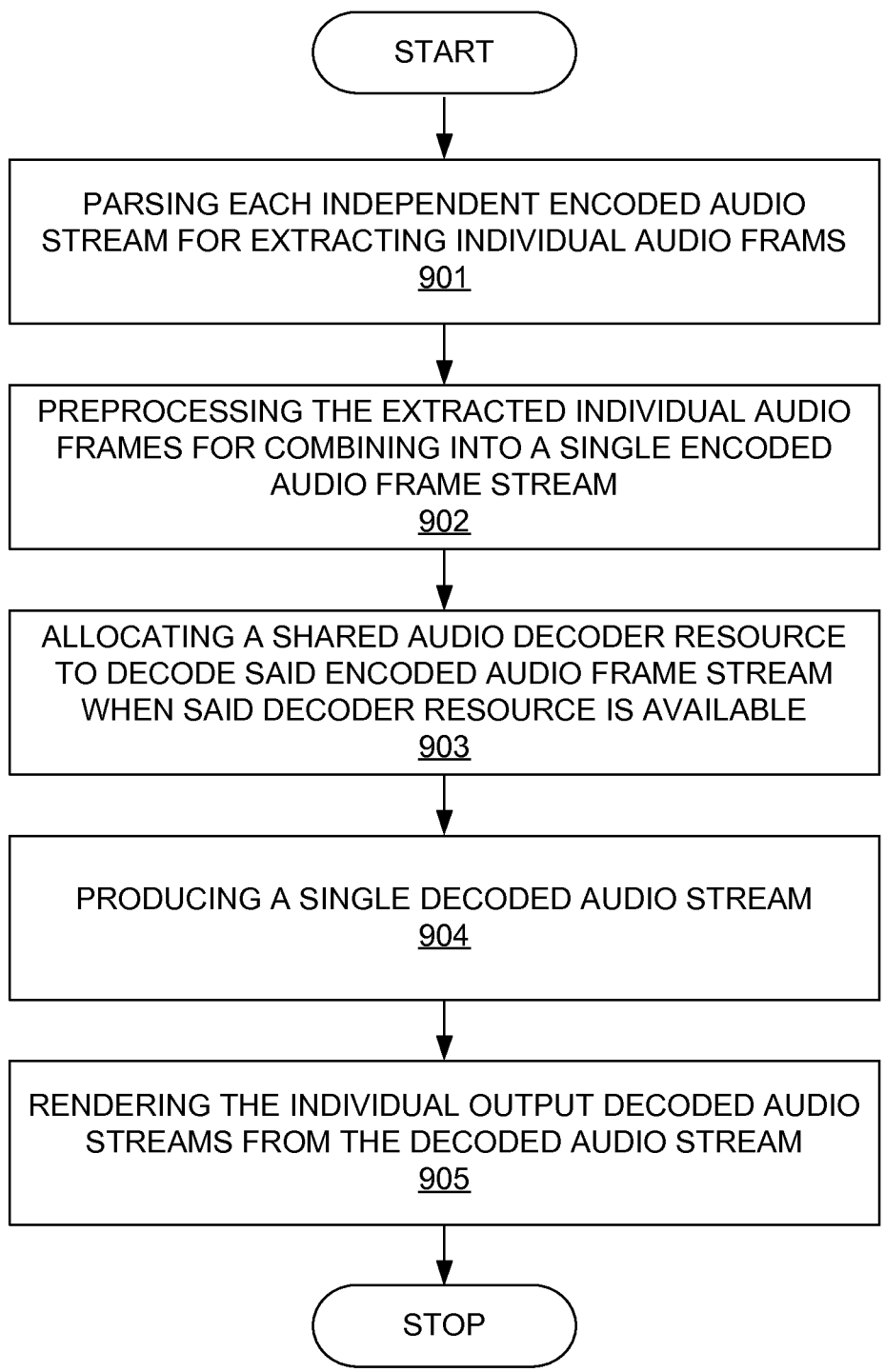
FIG. 9 illustrates a flow diagram of a method for decoding multiple independent encoded audio streams according to an embodiment of the present invention.

FIG. 9 illustrates a flow diagram of a method for decoding multiple independent encoded audio streams according to an embodiment of the present invention. At step 901, each independent encoded audio stream is parsed for extracting individual audio frames. At step 902, the extracted individual audio frames are preprocessed for combining into a single encoded audio frame stream. At step 903, a shared audio decoder resource is allocated to decode the encoded audio frame stream when the decoder resource is available. At step 904, a single decoded audio stream is produced. At step 905, the individual output decoded audio streams are rendered from the decoded audio stream.

An embodiment of the present invention is related to a system for decoding multiple independent encoded audio streams and can be used in various applications, such as dual decoding set top boxes, dual decoding DVD players, set top boxes with audio description support, and multi site video conferencing systems.

An embodiment of the present invention offers several advantages. Firstly, an embodiment utilizes a single decoder for decoding multiple independent audio streams. Secondly, an embodiment is applicable to both hardware and software decoders. Thirdly, an embodiment supports multiplexed stream of various formats such as MPEG2, PES, Windows Media files, AVI etc.

Although the disclosure of a system has been described in connection with an embodiment of the present invention illustrated in the accompanying drawings, it is not limited thereto. It will be apparent to those skilled in the art that various substitutions, modifications and changes may be made thereto without departing from the scope and spirit of the disclosure.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A system for decoding multiple independent encoded audio streams comprising:
a parser coupled to each input encoded audio stream for extracting individual audio frames;
a preprocessor coupled to the outputs of all parsers for combining the outputs of said parsers into a single audio frame stream;
an audio decoder coupled to the output of said preprocessor for decoding the single audio frame stream into a single decoded stream such that the single decoded audio stream retains data from each encoded audio stream; and
a renderer coupled to the output of said audio decoder for generating the individual output decoded audio streams from the single decoded stream.

2. The system as claimed in claim 1, wherein said preprocessor comprises:
a replicator for repeating selected audio frames; and
an interleaver coupled to the output of said replicator for combining the audio frames into a single pseudo interleaved audio frame stream.

3. The system as claimed in claim 1, wherein said renderer comprises:
a demultiplexer that segregates the multiplexed decoded audio frames into multiple output decoded audio frame streams; and
a frame selector coupled to the output of said demultiplexer that discards at least some decoded frames from individual decoded audio frame streams.

4. A system for decoding multiple independent encoded audio streams comprising:
a parser coupled to each input encoded audio stream for extracting individual audio frames;
a preprocessor coupled to the outputs of all parsers for combining the outputs of said parsers into a single audio frame stream;
an audio decoder coupled to the output of said preprocessor for decoding the single audio frame stream; and
a renderer coupled to the output of said audio decoder for generating the individual output decoded audio streams from the single decoded stream;
wherein said preprocessor comprises:
a replicator for repeating selected audio frames; and
an interleaver coupled to the output of said replicator for combining the audio frames into a single pseudo interleaved audio frame stream; and
wherein said replicator operates to repeat all frames except the first and the last frame of said input audio stream and the number of copies are determined by the number of samples required for window filter to converge to the point where proper filtered samples are available.

5. A set-top-box comprising audio and video subsystems, said audio subsystem comprising:
a parser coupled to each input encoded audio stream for extracting individual audio frames;
a preprocessor coupled to the outputs of all parsers for combining the outputs of said parsers into a single audio frame stream;
an audio decoder coupled to the output of said preprocessor for decoding the single audio frame stream into a single decoded audio stream such that the single decoded audio stream retains data from each encoded audio stream; and
a renderer coupled to the output of said audio decoder for generating the individual output decoded audio streams from the single decoded stream.

6. The set-top-box as claimed in claim 5, wherein said preprocessor comprises:
a replicator for repeating selected audio frames; and
an interleaver coupled to the output of said replicator for combining the audio frames into a single pseudo-interleaved audio frame stream.

7. The set-top-box as claimed in claim 5, wherein said renderer comprises:

a demultiplexer that segregates the multiplexed decoded audio frames into multiple output decoded audio frame streams; and a frame selector coupled to the output of said demultiplexer that discards at least some decoded frames from individual decoded audio frame streams.

8. A set-top-box comprising audio and video subsystems, said audio subsystem comprising:

a parser coupled to each input encoded audio stream for extracting individual audio frames;

a preprocessor coupled to the outputs of all parsers for combining the outputs of said parsers into a single audio frame stream;

an audio decoder coupled to the output of said preprocessor for decoding the single audio frame stream; and a renderer coupled to the output of said audio decoder for generating the individual output decoded audio streams from the single decoded stream;

wherein said preprocessor comprises:

a replicator for repeating selected audio frames; and an interleaver coupled to the output of said replicator for combining the audio frames into a single pseudo-interleaved audio frame stream; and wherein said replicator operates to repeat all frames except the first and the last frame of said input audio stream and the number of copies are determined by the number of samples required for window filter to converge to the point where proper filtered samples are available.

9. A DVD player comprising audio and video subsystems, said audio subsystem comprising:

a parser coupled to each input encoded audio stream for extracting individual audio frames;

a preprocessor coupled to the outputs of all parsers for combining the outputs of said parsers into a single audio frame stream;

an audio decoder coupled to the output of said preprocessor for decoding the single audio frame stream such that the single decoded audio stream retains data from each encoded audio stream; and a renderer coupled to the output of said audio decoder for generating the individual output decoded audio streams from the single decoded stream.

10. The DVD player as claimed in claim 9, wherein said preprocessor comprises:

a replicator for repeating selected audio frames; and an interleaver coupled to the output of said replicator for combining the audio frames into a single pseudo-interleaved audio frame stream.

11. The DVD player as claimed in claim 9, wherein said renderer comprises:

a demultiplexer that segregates the multiplexed decoded audio frames into multiple output decoded audio frame streams; and a frame selector coupled to the output of said demultiplexer that discards at least some decoded frames from individual decoded audio frame streams.

12. A DVD player comprising audio and video subsystems, said audio subsystem comprising:

a parser coupled to each input encoded audio stream for extracting individual audio frames;

a preprocessor coupled to the outputs of all parsers for combining the outputs of said parsers into a single audio frame stream;

an audio decoder coupled to the output of said preprocessor for decoding the single audio frame stream; and a renderer coupled to the output of said audio decoder for generating the individual output decoded audio streams from the single decoded stream;

wherein said preprocessor comprises:

a replicator for repeating selected audio frames; and an interleaver coupled to the output of said replicator for combining the audio frames into a single pseudo-interleaved audio frame stream; and wherein said replicator operates to repeat all frames except the first and the last frame of said input audio stream and the number of copies are determined by the number of samples required for window filter to converge to the point where proper filtered samples are available.

13. An audio processor capable of decoding multiple independent audio streams, said audio processor comprising:

a parser coupled to each input encoded audio stream for extracting individual audio frames;

a preprocessor coupled to the outputs of all parsers for combining the outputs of said parsers into a single audio frame stream;

an audio decoder coupled to the output of said preprocessor for decoding the single audio frame stream into a single decoded stream such that the single decoded audio stream retains data from each encoded audio stream; and a renderer coupled to the output of said audio decoder for generating the individual output decoded audio streams from the single decoded stream.

14. The audio processor as claimed in claim 13, wherein said preprocessor comprises:

a replicator for repeating selected audio frames; and an interleaver coupled to the output of said replicator for combining the audio frames into a single pseudo-interleaved audio frame stream.

15. The audio processor as claimed in claim 13, wherein said renderer comprises:

a demultiplexer that segregates the multiplexed decoded audio frames into multiple output decoded audio frame streams; and a frame selector coupled to the output of said demultiplexer that discards at least some decoded frames from individual decoded audio frame streams.

16. An audio processor capable of decoding multiple independent audio streams, said audio processor comprising:

a parser coupled to each input encoded audio stream for extracting individual audio frames;

a preprocessor coupled to the outputs of all parsers for combining the outputs of said parsers into a single audio frame stream;

an audio decoder coupled to the output of said preprocessor for decoding the single audio frame stream into a single decoded stream; and a renderer coupled to the output of said audio decoder for generating the individual output decoded audio streams from the single decoded stream;

wherein said preprocessor comprises:

a replicator for repeating selected audio frames; and an interleaver coupled to the output of said replicator for combining the audio frames into a single pseudo-interleaved audio frame stream; and wherein said replicator operates to repeat all frames except the first and the last frame of said input audio stream and the number of copies are determined by the number of samples required for window filter to converge to the point where proper filtered samples are available.

17. A method for decoding multiple independent encoded audio streams comprising:

parsing each independent encoded audio stream for extracting individual audio frames;
preprocessing the extracted individual audio frames for combining into a single encoded audio frame stream;
allocating a shared audio decoder resource to decode said encoded audio frame stream when said decoder resource is available;
producing a single decoded audio stream such that the simile decoded audio stream retains data from each encoded audio stream; and
rendering the individual output decoded audio streams from said decoded audio stream.

18. The method as claimed in claim 17, wherein said rendering comprises forming independent decoded audio stream from the decoded stream by eliminating at least some audio frames.

19. The method as claimed in claim 17, wherein said preprocessing comprises:
replicating selected extracted audio frames from each stream;
creating a single pseudo-interleaved audio frame stream from the parsed and replicated audio frames of all the input streams.

20. The method as claimed in claim 19, wherein said creating comprises pseudo-interleaving of the audio frames and the replicated audio frames from each independent encoded audio stream.

21. A method for decoding multiple independent encoded audio streams comprising:
parsing each independent encoded audio stream for extracting individual audio frames;
preprocessing the extracted individual audio frames for combining into a single encoded audio frame stream;
allocating a shared audio decoder resource to decode said encoded audio frame stream when said decoder resource is available;
producing a single decoded audio stream;
rendering the individual output decoded audio streams from said decoded audio stream; and
replicating selected extracted audio frames from each stream;
wherein said replicating of selected extracted audio frames comprises repeating those frames that are required for obtaining convergence due to window filtering.

22. An audio circuit, comprising:
an audio driver configured to receive encoded input audio streams and to generate a single encoded audio stream from the input audio streams;
an audio decoder configured to generate a single decoded audio stream from the single encoded audio stream that includes data from each encoded input audio stream; and
a renderer configured to generate from the single decoded audio stream decoded output audio streams that respectively correspond to the encoded input audio streams.

23. The audio circuit of claim 22 wherein
the audio driver is configured:
to receive a first encoded input audio stream having first audio frames;
to receive a second encoded input audio stream having second audio frames;
to generate a first encoded intermediate audio stream from the first encoded input audio stream by duplicating at least one of the first audio frames;
to generate a second encoded intermediate audio stream from the second encoded input audio stream by duplicating at least one of the second audio frames; and to generate the single encoded audio stream by time multiplexing the first and second intermediate audio streams.

24. The audio circuit of claim 22 wherein
the audio driver is configured:
to receive a first encoded input audio stream having first audio frames;
to receive a second encoded input audio stream having second audio frames;
to duplicate at least one of the first audio frames;
to duplicate at least one of the second audio frames; and
to generate the single encoded audio stream by interleaving the first input audio stream, the second input audio stream, the at least one duplicated first audio frame, and the at least one duplicated second audio frame.

25. The audio circuit of claim 22 wherein
the audio driver is configured:
to receive a first encoded input audio stream having first audio frames;
to receive a second encoded input audio stream having second audio frames;
to duplicate at least one sequence of the first audio frames;
to duplicate at least one sequence of the second audio frames; and
to generate the single encoded audio stream by interleaving the first input audio stream, the second input audio stream, the at least one duplicated sequence of the first audio frames, and the at least one duplicated sequence of the second audio frames.

26. The audio circuit of claim 22 wherein
the audio driver is configured:
to receive a first encoded input audio stream having first audio frames;
to receive a second encoded input audio stream having second audio frames; and
to generate the single encoded audio stream having a first sequence of the first audio frames, followed by a first sequence of the second audio frames, followed by a second sequence of the first audio frames, followed by second sequence of the second audio frames, the first and second sequences of the first audio frames each including at least one common first audio frame, and the first and second sequences of the second audio frames each including at least one common second audio frame.

27. The audio circuit of claim 22 wherein:
the single encoded audio stream includes at least one duplicate encoded frame from each input audio stream; and
the audio decoder is configured to generate the single decoded audio stream including at least one respective duplicate decoded frame corresponding to each duplicate encoded frame.

28. The audio circuit of claim 22 wherein:
the single encoded audio stream includes at least one encoded frame from each input audio stream; and
the audio decoder is configured to generate the single decoded audio stream including at least one decoded frame corresponding to each encoded frame of the single encoded audio stream.

29. The audio circuit of claim 22 wherein:
the audio decoder is configured to generate the single decoded audio stream including at least one decoded frame corresponding to each of the encoded input audio streams and at least one frame; and
the renderer is configured to generate the decoded output audio streams by discarding the at least one duplicate frame and by generating each decoded output audio stream from undiscarded decoded frames that correspond to a respective one of the encoded input audio streams.

30. The audio circuit of claim 22 wherein:
the audio decoder is configured to generate the single decoded audio stream including at least one decoded frame corresponding to each of the encoded input audio streams and at least one frame; and
the renderer is configured to generate the decoded output audio streams by assigning each first instance of each decoded frame to a respective one of the output audio stream and discarding any subsequent instances of each decoded frame.

31. An audio circuit, comprising:
an audio driver configured to receive encoded input audio streams and to generate a single encoded audio stream from the input audio streams;
an audio decoder configured to generate a single decoded audio stream from the single encoded audio stream; and
a renderer configured to generate from the single decoded audio stream decoded output audio streams that respectively correspond to the encoded input audio streams;
wherein the audio driver is configured:
to receive a first encoded input audio stream having first audio frames;
to receive a second encoded input audio stream having second audio frames; and
to generate the single encoded audio stream having a first sequence of two of the first audio frames, followed by a first sequence of two of the second audio frames, followed by a second sequence of two of the first audio frames, followed by second sequence of two of the second audio frames, the first and second sequences of the first audio frames each including at least one common first audio frame, and the first and second sequences of the second audio frames each including at least one common second audio frame.

32. An audio circuit, comprising:
an audio driver configured to receive encoded input audio streams and to generate a single encoded audio stream from the input audio streams;
an audio decoder configured to generate a single decoded audio stream from the single encoded audio stream; and
a renderer configured to generate from the single decoded audio stream decoded output audio streams that respectively correspond to the encoded input audio streams;
wherein the audio driver is configured:
to receive a first encoded input audio stream having first audio frames;
to receive a second encoded input audio stream having second audio frames; and
to generate the single encoded audio stream having a first sequence of four of the first audio frames, followed by a first sequence of four of the second audio frames, followed by a second sequence of four of the first audio frames, followed by second sequence of four of the second audio frames, the first and second sequences of the first audio frames each including at least two common first audio frames, and the first and second sequences of the second audio frames each including at least two common second audio frames.

33. A system, comprising:
input nodes configured to receive respective encoded input audio streams; and
an audio circuit coupled to the input nodes and including an audio driver configured to receive each of the encoded input audio streams and to generate a single encoded audio stream from the input audio streams that includes data from each of the encoded input audio streams,
an audio decoder configured to generate a single decoded audio stream from the single encoded audio stream, and
a renderer configured to generate from the single decoded audio stream decoded output audio streams that respectively correspond to the encoded input audio streams.

34. The system of claim 33, further comprising a converter configured to convert at least one of the decoded output audio streams into a corresponding sound signal.

35. The system of claim 33, further comprising a transducer configured to convert at least one of the decoded output audio streams into a corresponding sound signal.

36. A method, comprising:
generating a single encoded audio stream from encoded input audio streams;
generating a single decoded audio stream from the single encoded audio stream having at least some data from each of the encoded input audio streams; and
generating from the single decoded audio stream decoded output audio streams that respectively correspond to the encoded input audio streams.

37. The method of claim 36, further comprising:
wherein a first one of the encoded input audio streams includes first audio frames;
wherein a second one of the encoded input audio streams includes second audio frames;
generating a first encoded intermediate audio stream from the first encoded input audio stream by replicating at least one of the first audio frames;
generating a second encoded intermediate audio stream from the second encoded input audio stream by replicating at least one of the second audio frames; and
generating the single encoded audio stream includes time multiplexing the first and second intermediate audio streams.

38. The method of claim 36, further comprising:
wherein a first one of the encoded input audio streams includes first audio frames;
wherein a second one of the encoded input audio streams includes second audio frames;
replicating at least one of the first audio frames;
replicating at least one of the second audio frames; and
interleaving the first input audio stream, the second input audio stream, the at least one replicated first audio frame, and the at least one replicated second audio frame to generate the single encoded audio stream.

39. The method of claim 36, further comprising:
wherein a first one of the encoded input audio streams includes first audio frames;
wherein a second one of the encoded input audio streams includes second audio frames;
replicating at least one sequence of the first audio frames;
replicating at least one sequence of the second audio frames; and
interleaving the first input audio stream, the second input audio stream, the at least one replicated sequence of the first audio frames, and the at least one replicated sequence of the second audio frames to generate the single encoded audio stream.

40. The method of claim 36, further comprising:
wherein a first one of the encoded input audio streams includes first audio frames;

wherein a second one of the encoded input audio streams includes second audio frames; and concatenating a first sequence of the first audio frames, followed by a first sequence of the second audio frames, followed by a second sequence of the first audio frames, and followed by a second sequence of the second audio frames to generate the single encoded audio stream, the first and second sequences of the first audio frames each including at least one common first audio frame, and the first and second sequences of the second audio frames each including at least one common second audio frame.

41. The method of claim 36, further comprising:

wherein the single encoded audio stream includes at least one replica encoded frame from each input audio stream; and generating the single decoded audio stream including at least one respective replica decoded frame that corresponds to each replica encoded frame.

42. The method of claim 36, further comprising:

wherein the single encoded audio stream includes at least one encoded frame from each input audio stream; and generating the single decoded audio stream including at least one respective decoded frame that corresponds to each encoded frame of the single encoded audio stream.

43. The method of claim 36, further comprising:

generating the single decoded audio stream including at least one respective decoded frame that corresponds to each of the encoded input audio streams, and including at least one replica frame; and generating the decoded output audio streams by discarding the at least one replica frame and by generating each decoded output audio stream from undiscarded decoded frames that correspond to a respective one of the encoded input audio streams.

44. The method of claim 36, further comprising:

generating the single decoded audio stream including at least one respective decoded frame that corresponds to each of the encoded input audio streams, and including at least one replica frame; and generating the decoded output audio streams by assigning each first instance of each decoded frame to a respective one of the output audio stream and discarding any subsequent instances of each decoded frame.

45. A method, comprising:

generating a single encoded audio stream from encoded input audio streams;

generating a single decoded audio stream from the single encoded audio stream; and generating from the single decoded audio stream decoded output audio streams that respectively correspond to the encoded input audio streams;

the method further comprising:

wherein a first one of the encoded input audio streams includes first audio frames;

wherein a second one of the encoded input audio streams includes second audio frames; and concatenating a first sequence of two of the first audio frames, followed by a first sequence of two of the second audio frames, followed by a second sequence of two of the first audio frames, followed by second sequence of two of the second audio frames, to generate the single encoded audio stream, the first and second sequences of the first audio frames each including at least one common first audio frame, and the first and second sequences of the second audio frames each including at least one common second audio frame.

46. A method, comprising:

generating a single encoded audio stream from encoded input audio streams;

generating a single decoded audio stream from the single encoded audio stream; and generating from the single decoded audio stream decoded output audio streams that respectively correspond to the encoded input audio streams;

the method further comprising:

wherein a first one of the encoded input audio streams includes first audio frames;

wherein a second one of the encoded input audio streams includes second audio frames; and concatenating a first sequence of four of the first audio frames, followed by a first sequence of four of the second audio frames, followed by a second sequence of four of the first audio frames, followed by a second sequence of four of the second audio frames, to generate the single encoded audio stream, the first and second sequences of the first audio frames each including at least two common first audio frames, and the first and second sequences of the second audio frames each including at least two common second audio frames.

* * * * *

UNITED STATES PATENT AND TRADEMARK OFFICE
CERTIFICATE OF CORRECTION

PATENT NO.         : 8,613,038 B2
APPLICATION NO.    : 12/910432
DATED              : December 17, 2013
INVENTOR(S)        : Rahul Bansal et al.

It is certified that error appears in the above-identified patent and that said Letters Patent is hereby corrected as shown below:

In the Claims:

Column 11, line 9, the phrase "simile decoded audio stream" should read --single decoded audio stream--

Signed and Sealed this
Third Day of June, 2014

Michelle K. Lee
*Deputy Director of the United States Patent and Trademark Office*